US008710776B2

(12) United States Patent
Bertotto et al.

(10) Patent No.: US 8,710,776 B2
(45) Date of Patent: Apr. 29, 2014

(54) METHOD FOR CONTROLLING A MOTOR

(75) Inventors: Ezio Bertotto, Bolzano Vicentino (IT);
Federico Di Santo, Sossano (IT);
Enrico Marodin, Barbarano Vicentino (IT)

(73) Assignee: Reel S.R.L., Ponte di Nanto (VI) (IT)

( * ) Notice: Subject to any disclaimer, the term of this patent is extended or adjusted under 35 U.S.C. 154(b) by 0 days.

(21) Appl. No.: 13/376,199

(22) PCT Filed: Jun. 4, 2010

(86) PCT No.: PCT/IB2010/052493
§ 371 (c)(1),
(2), (4) Date: Feb. 1, 2012

(87) PCT Pub. No.: WO2010/140137
PCT Pub. Date: Dec. 9, 2010

(65) Prior Publication Data
US 2012/0119686 A1 May 17, 2012

(30) Foreign Application Priority Data
Jun. 5, 2009 (IT) .............................. PD2009A0165

(51) Int. Cl.
*H02P 21/00* (2006.01)
(52) U.S. Cl.
USPC ..................................................... 318/400.02
(58) Field of Classification Search
None
See application file for complete search history.

(56) References Cited

U.S. PATENT DOCUMENTS

| 6,388,417 | B1* | 5/2002 | Keith ........................... 318/701 |
| 7,282,878 | B1* | 10/2007 | Rakov et al. ............. 318/400.01 |
| 7,745,949 | B2* | 6/2010 | Yang et al. ..................... 290/44 |
| 8,350,507 | B2* | 1/2013 | Ito et al. ................... 318/400.13 |
| 2004/0100222 | A1 | 5/2004 | Karikomi |
| 2005/0283324 | A1* | 12/2005 | Swanson ........................ 702/57 |
| 2007/0132415 | A1 | 6/2007 | Patel |
| 2009/0184678 | A1* | 7/2009 | Son et al. ...................... 318/801 |
| 2009/0212564 | A1* | 8/2009 | Yang et al. ..................... 290/44 |
| 2009/0237014 | A1* | 9/2009 | Yamada ................... 318/400.02 |
| 2009/0261770 | A1* | 10/2009 | Fujishiro et al. ............. 318/538 |
| 2010/0066283 | A1* | 3/2010 | Kitanaka ................. 318/400.02 |
| 2011/0043149 | A1* | 2/2011 | Kitanaka ................. 318/400.26 |
| 2011/0062908 | A1* | 3/2011 | Kitanaka ................. 318/400.22 |
| 2011/0148335 | A1* | 6/2011 | Harakawa et al. ....... 318/400.02 |

FOREIGN PATENT DOCUMENTS

FR 2825853 12/2002

* cited by examiner

*Primary Examiner* — Shawki S Ismail
*Assistant Examiner* — Zoheb Imtiaz
(74) *Attorney, Agent, or Firm* — Themis Law

(57) ABSTRACT

A method for controlling a motor by an inverter and by a vectorial technique, comprising the following steps: determining the value of a quadrature current Iq necessary for said motor to generate the desired torque; calculating the value of a direct current to be supplied to the motor by an equation as a function of the phase of the current vector on which the torque constant of the motor depends; calculating the power current of said motor from the direct current and the quadrature current; supplying the power current to the motor through the inverter.

14 Claims, 2 Drawing Sheets

METHOD FOR CONTROLLING A MOTOR

FIELD OF THE INVENTION

The present invention generally finds application in the field of electric drives for motors.

Particularly, the present invention relates to motor control by electric drives, generally equipped with inverters.

BACKGROUND ART

In modern technology, motors are among the most commonly used elements in various applications. Many types of different motors have been developed and used, according to particular types of applications. For example, motors may be grouped into synchronous and asynchronous motors or DC or AC motors.

In any case, the need is increasingly felt to improve the efficiency of such motors. In view of the above, there are many applications in which motors might deliver a variable torque at different working time. For this reason, in order to improve efficiency, it might be useful to change the motor speed to avoid energy wastes when the motor might work in a slow running state.

Thus, electric drives with inverters are used, which are adapted to adjust the motor speed.

One of the main motor control techniques implemented by said drives is the vectorial technique, one example of which is the field orientation technique.

In short, since the DC motor has been always used as a model, due to the sharp distinction between the bias flux excitation current and the torque generating armature current, a general motor is controlled by such vectorial technique, which allows the power current to be divided into two components, known as direct current and quadrature current, which may be assimilated to the flux current and the armature current of a DC current, so that the motor may be ideally used like the above mentioned model motor. This will maximize the performances of any motor in terms of torque at various rotation speeds, speed accuracy and efficiency.

In vectorial control, direct current is similar to flux current, whereas quadrature current corresponds to armature current. Torque generation is controlled by adjusting the quadrature current, once the motor specific direct current has been determined.

A particular example is the synchronous reluctance motor where, as mentioned above, direct current control may be replaced by direct flux control.

Considering the example of the field orientation vector technique, in the control of a prior art motor, ready response can be only obtained by having direct current set to the nominal value, while quadrature current is set by a speed or torque regulator. Nevertheless, this affects efficiency, because the motor is always powered at the maximum capacity, even in case of minimal torque requirement, i.e. when the motor can run at low speed. In other words, while this arrangement keeps motor efficiency unaltered at high running speeds, efficiency is decreased, possibly to a considerable extent, at low running speeds.

For these reasons, controllers are known, which also change direct current, by adjusting the voltage at the ends of the motor as a function of load.

While this improves motor efficiency by decreasing the current supplied thereto at low running speeds, it still involves the drawback that such control is an indirect, non optimal manner to act upon direct current.

Furthermore, it is obtained by supplying predetermined direct currents in the presence of predetermined loads. Such solution is apparently not optimal, especially in the presence of mixed loads.

In other words, even when prior art motors are controlled by a field orientation vectorial technique to assimilate them to a DC motor, they still have efficiency losses at low running speeds, although control involves a change of both quadrature and direct currents.

A particular example is that of motors having controllers operating in vectorial mode, with no position or rotation speed sensor, also known as sensorless vectorial control. In this type of motors, this problem is even more serious. While the rotation speed and position of the rotor may be detected using the back electromotive force at high running speeds, the inherent impedance of the motor prevents the use of this method at low running speeds. Voltage losses cause a non negligible error, when compared with the absolute value of the back electromotive force. For this reason, at low running speeds, an additional zero-mean time-dependent voltage is added to the supply voltage. Suitable control algorithms, representing the motor-inverter assembly, such as a resolver-to-digital converter, where the motor acts as the resolver and the inverter decodes the resultant to the voltage signal altered by the added noise, provide values approximately proportional to the difference between the actual position and the estimated position, the added signal being generated at the same time as the fundamental component of the inverter.

Nevertheless, such added voltage at low running speeds induces additional work in the motor, which results in an efficiency loss.

DISCLOSURE OF THE INVENTION

The object of the present invention is to at least partially overcome the above drawbacks, by providing a method for controlling a motor that can increase the efficiency thereof even at low torque settings.

Another object is to provide a method for controlling a motor that can increase efficiency at low running speeds even in sensorless motors, i.e. motors with no sensor for detecting the rotation speed and the position of the rotor during operation.

These and other objects, as better explained hereafter, are fulfilled by a method for controlling a motor as defined in the main claim.

Particularly, the method uses a vectorial technique and an inverter. It generally includes the steps of:

determining the value of a quadrature current $I_q$ necessary for the motor to generate the desired torque;

calculating the value of a direct current $I_d$ to be supplied to the motor by the equation:

$$I_d = \frac{I_q}{\tan(k_t)}$$

wherein $k_t$ is the phase of the current vector on which the torque constant of said motor is known to depend;

calculating the power current of said motor by means of said direct current $I_d$ and said quadrature current $I_q$;

supplying said power current to said motor by said inverter.

In other words, the direct current $I_d$ is not constant, but changes with the quadrature current $I_q$. This allows optimization of the power current supplied to the motor according to the torque it is designed to develop. As a result, the efficiency of the motor so controlled is optimized.

In one aspect of the invention, the torque constant of the motor is the maximum torque constant that can be obtained at any load condition and is determined in a particular step, during which the motor is characterized as a function of the direct current $I_d$ and the quadrature current $I_q$, to obtain the maximum torque constant curve.

Therefore, the variation of the direct current $I_d$ as a function of the quadrature current $I_q$ is related to the maximum obtainable torque constant, i.e. the optimization of the power current supplied to the motor is related to the maximum torque constant. This provides maximized motor efficiency.

The same objects are also fulfilled by a motor controlling device that implements the above method. Therefore, the device will include at least one inverter, for supplying power to the motor, and processing means operating on said inverter to control power supply to the motor.

In one aspect of the invention, the processing means are designed to calculate the power supply current from a direct current $I_d$ and a quadrature current $I_q$, the quadrature current $I_q$ being determined based on the mechanical torque value that the motor is designed to control, i.e. to absorb in case of a braking torque or to deliver in case of a motive torque. The direct current $I_d$ is calculated by the processing means through the equation $$I_d = \frac{I_q}{\tan(k_t)}$$

wherein $k_t$ is the phase of the current vector that defines the torque constant of the motor.

Advantageous embodiments of the invention are defined in accordance with the dependent claims.

For example, the method may include a step of conditioning the direct current $I_d$, where the direct current value that is used to obtain the power current is limited by a predetermined minimum threshold value.

The motor magnetization flux depends on the direct current $I_d$, which prevents demagnetization of the motor under minimal loads.

Likewise, the method may include an additional step of conditioning the direct current $I_d$, where the latter is limited by a predetermined maximum limit value. This prevents saturation of the motor with an excessive magnetization flux.

BRIEF DESCRIPTION OF THE DRAWINGS

Further characteristics and advantages of the invention will be more apparent from the detailed description of a few preferred, non-exclusive embodiments of a method for controlling a motor, and a control device adapted to implement said method according to the invention, which are described as non-limiting examples.

DETAILED DESCRIPTION OF A PREFERRED EMBODIMENT

Figure 1:
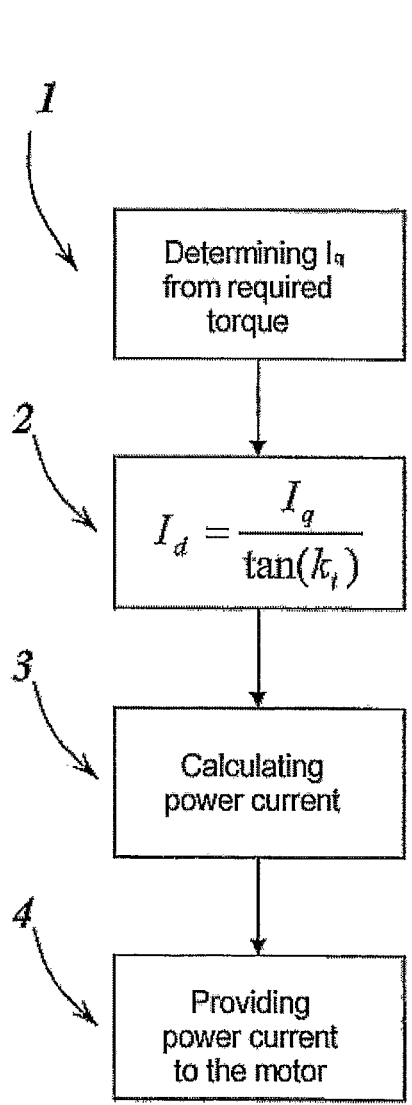
FIG. 1 is a schematic view of the method of the invention.

Referring to FIG. 1, there is described a method for controlling a motor by a vectorial technique and an inverter.

As mentioned above, the use of a vectorial technique allows control of a general motor as if it were a DC motor, with all advantages deriving therefrom. Therefore, the invention described herein will be related to a general motor, even when it is specifically applied in the control of synchronous reluctance motors.

The method described herein comprises a first step, designated by numeral 1, where the value of the quadrature current $I_q$ is determined. As is known and mentioned hereinabove, this current is responsible for the mechanical torque delivered by the motor. Once the load and the torque to be delivered by the motor are known, the quadrature current $I_q$ is determined.

In a later step, designated by numeral 2, the direct current $I_d$ to be supplied to the motor is determined by the equation:

$$I_d = \frac{I_q}{\tan(k_t)}$$

wherein $k_t$ is the phase of the current, which is known to be related to the torque constant of the motor defined thereby.

The direct current $I_d$ will generate the bias flux in the motor. As mentioned above, in the prior art it was constantly held at a nominal value, or changed in accordance with a rule related to the type of assumed applied load, which caused a loss of motor efficiency. At low running speeds, it might be optimized in response to actual requirements, thereby avoiding undesired wastes. Furthermore, in case of a sudden request for a torque higher than expected, the system didn't operate properly, and might even be exposed to a risk of total loss of control, due to the lack of flux to the motor.

Therefore, the present method improves the efficiency of the controlled motor, because the direct current $I_d$ supplied thereto is not constant and does not change according to a previously estimated rule, but changes with the quadrature current $I_q$, i.e. with the actual torque requirements, by the torque coefficient $k_t$.

Once the direct current $I_d$ and the quadrature current $I_c$, are known, the power current to be supplied to the motor may be determined, as shown in step 3. In the last step, designated by numeral 4, the inverter is controlled to supply such current to the motor.

In one aspect of the invention, power current calculation is related to the type of motor. For example, in case of an asynchronous motor, the power current is determined by vector addition of the direct current $I_d$ and the quadrature current $I_q$, which may be assimilated to two vectors having the same modulus as the previously calculated values.

In the case of a DC current, the two current values are separately supplied to the motor by a converter.

Particularly, in the exemplary case of a synchronous reluctance motor, like the asynchronous motor, the direct current $I_d$ directly provides the direct magnetization flux, which is the relevant parameter for the implementation of this patent.

In another aspect of the invention, the torque constant $K_t$ of the motor has the maximum obtainable value. This affords further optimization of motor efficiency. Since the direct current $I_d$ and the quadrature current $I_q$ have such values that the resulting vector has a constant angle, corresponding to the maximum obtainable torque constant $K_t$, the efficiency of the motor during operation is necessarily maximized.

In any case, the torque constant $K_t$ is a motor specific parameter, which is generally determined in a special calculation step.

Figure 2:
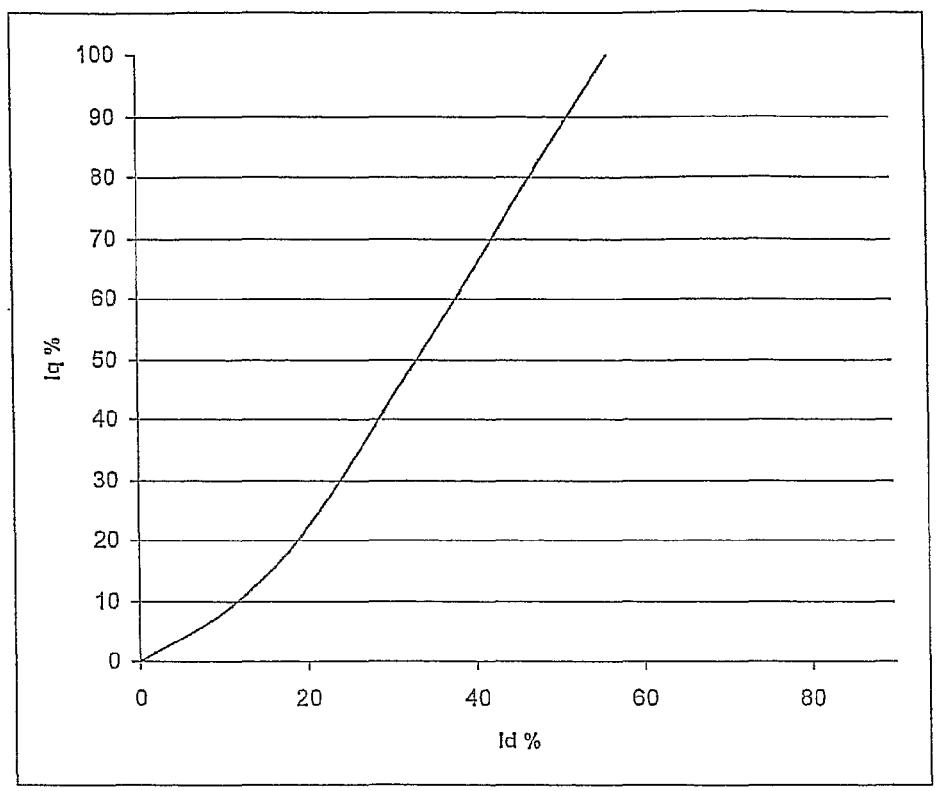
FIG. 2 shows a function example, defining the motor torque maximization point as a function of the power current.

For instance, when considering the power current to the motor as a rotating vector with a constant modulus, the points at which the highest torque is produced may be found along the circular path of such current vector. As the current modulus is increased, a function is determined, that defines the current-related torque maximization point. Since the power current vector may be divided into vectors of direct current $I_d$ and quadrature current $I_q$, then this determined function may be expressed as a function of these two currents. One example may be found FIG. 2. For instance, in synchronous reluctance motors, this function may be approximated to a line whose inclination changes as a function of the motor specifications.

Such parameter may be also mathematically determined by the designer of the motor. It shall be understood that this step is carried out to check and/or update this parameter.

Figure 3:
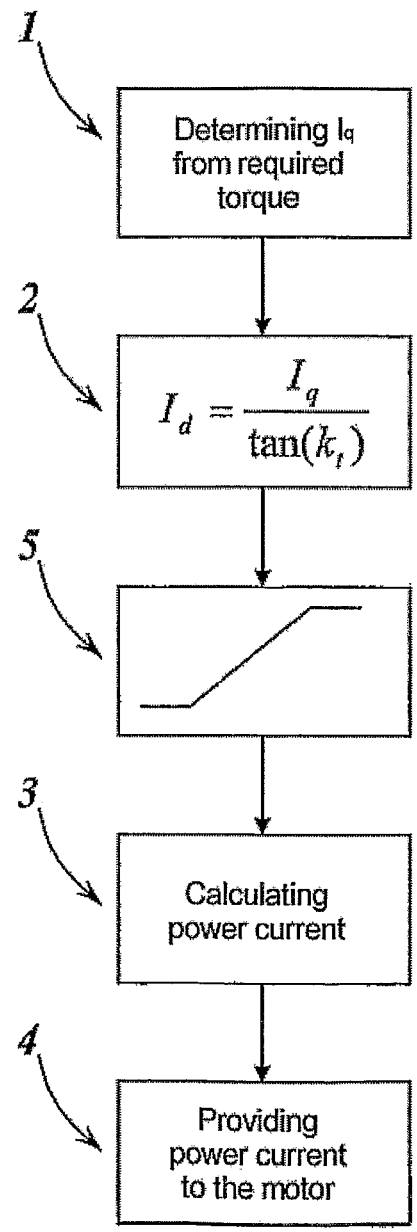
FIG. 3 is a further schematized view of the method of the invention.

In a further aspect of the invention, the control method includes at least one step of conditioning the direct current $I_d$, which is designated by numeral 4 in FIG. 3.

In a first conditioning example, the direct current $I_d$ that is used to determine the power current is equal to the direct current $I_d$ as determined by the above mentioned equation for values higher than a predetermined threshold value, and is equal to such predetermined threshold when the determined direct current $I_d$ is lower than such threshold value.

In other words, the direct current $I_d$ has a lower limit value, i.e. a minimum admissible value, beyond which it no longer decreases, which is equal to a predetermined threshold value.

This prevents full demagnetization of the motor when the latter is required to deliver a minimal torque, and ensures motor control even under minimal loads. The low current operation area is also approximated, where the above function related to the torque constant $K_t$ is generally not linear.

Experimental tests have shown that an optimal threshold value is a value allowing the motor magnetization flux to be about 60% its nominal value.

In another exemplary step of conditioning the direct current $I_d$, which may be also implemented as an additional conditioning step, the direct current $I_d$ that is used to determine the power current is determined by the above mentioned equation for values lower than a predetermined maximum limit value, and is equal to such predetermined maximum limit value for higher values.

In other words, the direct current $I_d$ has a higher limit, i.e. a maximum admissible value, beyond which it no longer increases, which is equal to a predetermined threshold value.

This prevents the increase of the magnetization flux from causing saturation of the supply voltage to the motor. Also, the nominal magnetization flux may be exceeded to further increase the efficiency of the motor as long as a distance from the supply voltage saturation value is ensured.

As mentioned above, the control may also be of sensorless type.

The position and rotation speed of the rotor is determined by the back electromotive force generated thereby. Nevertheless, at low running speeds, where the motor suffers from an efficiency loss, as mentioned in the prior art as a drawback, back electromotive force cannot be used, because its value is comparable to, and hence altered by, the voltage drop on the motor impedance.

In this case, an additional voltage, generally a zero-mean sinusoidal voltage, is generally known to be added to the supply voltage, for performing the desired detection. Nevertheless, even when such voltage has small values, it is no longer negligible at low running speeds with respect to the supply voltage, which is decreased, as mentioned above, to increase motor efficiency. As a result, although the additional voltage has a zero mean value, it still induces a non negligible additional work in the motor, and affects efficiency thereof.

For this reason, the present method also includes a step of insertion of such additional voltage, during which its generation involves a variable modulus.

Figure 4:
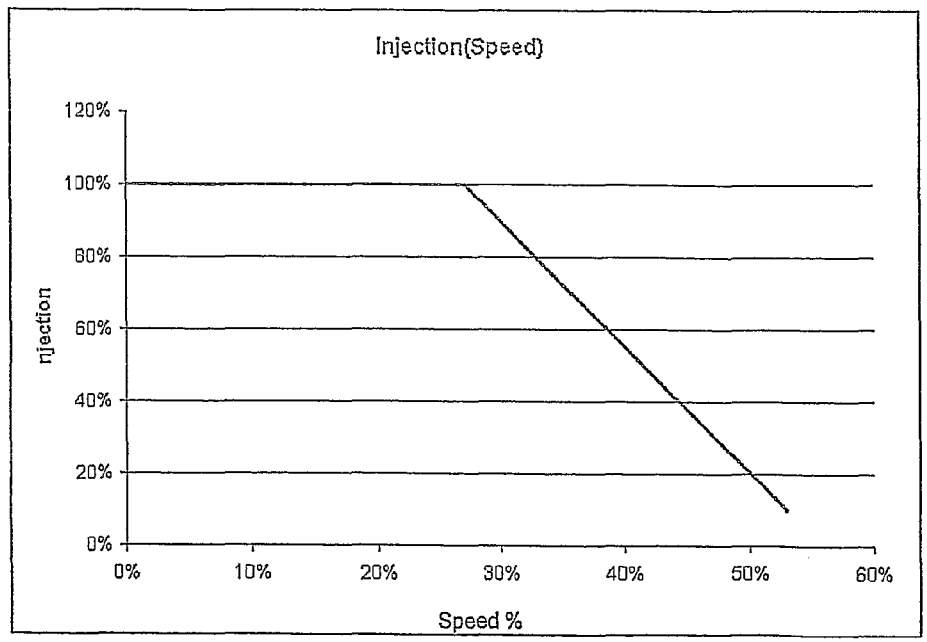
FIG. 4 shows an example of a curve representing the percentage of an additional power supply voltage to a motor as a function of the percentage of the running speed of the motor.

Particularly, the amplitude of the additional voltage shall ensure proper estimation of the rotor position. Experimental tests have confirmed that a high-amplitude additional voltage is desired at low running speeds, whereas the influence of amplitude is reduced ad higher running speeds. A high-amplitude additional voltage was found to be even detrimental at particularly high running speeds, with the torque being higher with low values. This behavior is explained in that the additional voltage causes a flux variation, although with a zero mean value, at medium-to-high running speeds. In this case, the voltage change adds to the electromotive force and causes saturation of the motor. The amount of added voltage has to be reduced and limited as a function of the running speed of the motor. A limiting example is shown in FIG. 4 where the X-axis indicates the percentage of the operating speed of the motor based on the maximum speed, and the Y-axis indicated the percentage of the added voltage, based on the most appropriate value. An optimal threshold beyond which the amplitude of the additional voltage should be reduced, e.g. using a linear function as shown in FIG. 4, was experimentally found at an operating speed of the motor corresponding to 40% the maximum speed.

Furthermore, the method of the invention may include a step of calculating and conditioning the additional voltage in which the latter is determined as a function of the quadrature current $I_q$, i.e. as a function of the torque to be delivered. Particularly, the modulus of the added voltage is reduced as a function of the quadrature current, no high voltage value being required when the quadrature current has small values.

This allows the additional voltage technique to be used to detect the rotation speed and position of the rotor while maintaining the efficiency of the motor.

It should be noted, amongst other things, that at low running speeds, the additional voltage causes the motor to emit noise. The above described step also advantageously allows reduction of such noise.

In another aspect of the invention, since the back electromotive force technique may be used at high running speeds, both techniques may be used at the same time, with priority being assigned to the results obtained with the back electromotive force at high running speeds and to the results obtained with the additional voltage technique at low running speeds. At intermediate running speeds the results are mixed. It will be appreciated that this allows further reduction of the amplitude of the additional voltage and hence of the efficiency loss caused thereby in the motor. The noise emitted by the motor is also reduced.

It shall be also noted that the additional voltage causes further efficiency losses because, since the inverter modulates such voltage on the fundamental voltage of the motor, it necessarily consumes electric energy. Such consumption is a function of the additional voltage frequency, the higher the frequency the higher the consumption. Since frequency is increased to reduce the noise generated by the motor as such voltage is added, any reduction of the noise obtained as described above will apparently allow reduction of the additional voltage frequency and thus of the energy consumption of the inverter. In other words, this affords further maximization of motor efficiency by such control.

According to one aspect of the invention, the frequency of the additional voltage may be also continuously changed, thereby optimizing motor efficiency by the control and minimizing the perception of the noise caused thereby.

Particularly, the frequency of the substantially sinusoidal additional voltage is caused to be variable using a random or pseudo-random calculation technique.

Due to the above, the invention also relates to a device for controlling a motor that implements the method as described hereinbefore.

Therefore, the device includes at least one inverter, for supplying power to the motor, and processing means operating on the inverter to control power supply to the motor.

Such processing means are adapted to calculate the power current to be supplied from a direct current $I_d$ and a quadrature current $I_g$. The quadrature current $I_q$ will be determined from the mechanical torque value to be generated by the motor, whereas the direct current $I_d$ will be calculated by the processing means through the equation $$I_d = \frac{I_q}{\tan(k_t)}$$

where $k_t$ is the phase of the current vector that defines the torque constant of the motor.

The device will not be described in further detail herein to avoid repetitions, the device having such features as to allow implementation of the method as described above.

It shall be further noted that the method of the invention is designed to be implemented through an appropriate IT product, which also falls within the present inventive concept. Particularly, the IT product is designed to be loaded in the memory of a computer, to be executed thereby. This computer may constitute or be part of the processing means of the device of the invention.

The above disclosure clearly shows that the method and device of the invention at least partially obviate the prior art drawbacks.

Particularly, they increase motor efficiency even at low running speeds.

Namely, such efficiency increase is particularly remarkable in case of sensorless controls, with the addition of voltage noise.

The method and device of the invention are susceptible to a number of changes or variants, within the inventive concept disclosed in the annexed claims. All the details thereof may be replaced by other technically equivalent parts, and the materials may vary depending on different needs, without departure from the scope of the invention.

While the method and device have been described with particular reference to the accompanying figures, the numerals referred to in the disclosure and claims are only used for the sake of a better intelligibility of the invention and shall not be intended to limit the claimed scope in any manner.

The invention claimed is:

1. A method for controlling a motor by an inverter and by a vectorial technique, comprising the following steps:

fixing a value of a quadrature current $I_q$ necessary for said motor to generate a desired torque;

calculating a value of a direct current $I_d$ to be supplied to said motor by equation:

$$I_d = \frac{I_q}{\tan(k_t)}$$

where $k_t$ is a phase of a current vector from which a torque constant of said motor depends;

calculating a power current of said motor by said direct current $I_d$ and said quadrature current $I_q$;

supplying said power current to said motor by said inverter; and fixing rotation speed and position of a rotor of said motor without position and speed sensors, wherein said step of fixing rotation speed and position of said rotor comprises a sum of an additional substantially sinusoidal power voltage to a voltage power of said motor, and wherein said additional power voltage has a module variable with one or more of the rotation speed of said rotor or with a torque needed by said motor with a load thereof.

2. The method as claimed in claim 1, wherein said torque constant of said motor is a highest obtainable torque.

3. The method as claimed in claim 1, further comprising a step of determining said torque constant before said step of determining said quadrature current $I_q$.

4. The method as claimed in claim 1, further comprising a step of conditioning said direct current $I_d$, wherein the value of said direct current $I_d$ is limited in lower values thereof to a predetermined threshold value.

5. The method as claimed in claim 1, further comprising a step of conditioning said direct current $I_d$, wherein the value of said direct current $I_d$ is superiorly limited to a predetermined maximum value.

6. The method as claimed in claim 1, further comprising a step of fixing rotation speed and position of a rotor of said motor without position and speed sensors.

7. A method of controlling a motor by an inverter and by a vectorial technique, comprising the following steps:

fixing a value of a quadrature current $I_q$ necessary for said motor to generate a desired torque;

calculating a value of a direct current $I_d$ to be supplied to said motor by equation:

$$I_d = \frac{I_q}{\tan(k_t)}$$

where $k_t$ is a phase of a current vector from which a torque constant of said motor depends;

calculating a power current of said motor by said direct current $I_d$ and said quadrature current $I_q$;

supplying said power current to said motor by said inverter; and fixing rotation speed and position of a rotor of said motor without position and speed sensors, wherein said step of fixing rotation speed and position of said rotor comprises a sum of an additional substantially sinusoidal power voltage to a voltage power of said motor, and wherein said additional power voltage has a module variable with a torque needed by said motor with a load thereof and a variable frequency fixed by a casual or pseudo casual calculating technique.

8. The method as claimed in claim 7, wherein said torque constant of said motor is a highest obtainable torque.

9. The method as claimed in claim 7, further comprising a step of determining said torque constant before said step of determining said quadrature current $I_q$.

10. The method as claimed in claim 7, further comprising a step of conditioning said direct current $I_d$, wherein the value of said direct current $I_d$ is limited in lower values thereof to a predetermined threshold value.

11. The method as claimed in claim 7, further comprising a step of conditioning said direct current $I_d$, wherein the value of said direct current $I_d$ is superiorly limited to a predetermined maximum value.

12. The method as claimed in claim 7, wherein said direct current $I_d$ and said quadrature current $I_q$ have such values that a resulting current vector has a constant value corresponding to a maximum torque obtainable from said motor, thereby maximizing efficiency of said motor during operation.

13. The method as claimed in claim 12, wherein said constant value is mathematically calculated as a function of motor parameters.

14. The method as claimed in claim 12, wherein said constant value is experimentally determined by detecting an inclination of an approximately linear function between said direct current and said quadrature current.

* * * * *